April 28, 1953   C. H. SAVARY   2,636,193
SIGNAL DEVICE FOR INDICATING THE LOCATION
OF SUBMERGED OBJECTS
Filed July 8, 1952

INVENTOR
CLARENCE H. SAVARY

BY
McMorrow, Berman & Davidson
ATTORNEY

Patented Apr. 28, 1953

2,636,193

UNITED STATES PATENT OFFICE 2,636,193

SIGNAL DEVICE FOR INDICATING THE LOCATION OF SUBMERGED OBJECTS

Clarence H. Savary, Marion, Ohio

Application July 8, 1952, Serial No. 297,747

3 Claims. (Cl. 9—9)

This invention relates to signal devices for indicating the location of submerged objects and more particularly to a signal device adapted to be attached to an object and including a float and means effective to release the float a predetermined time after the signal device has been submerged in water.

It is among the objects of the invention to provide a signal device which can be easily secured to an object, such as a fishing rod, outboard motor or bait pail, or to the person of a swimmer, fisherman, workman or other, and will indicate the under water location of an associated object or person after the object or person has been submerged a predetermined period of time; which includes a body, a float releasably secured to the body and means responsive to the presence of water for releasing the float from the body; which requires a period of submersion of several hours before the float is released so that the device can be used in and near the water for an extended period of time without being operated to provide a signal; which is of small size and light weight so that it can be retained on an object or worn by a person without inconvenience; and which is simple and durable in construction, economical to manufacture, positive and effective in operation, and neat and attractive in appearance.

Other objects and advantages will become apparent from a consideration of the following description and the appended claims in conjunction with the accompanying drawing wherein:

Figure 1:
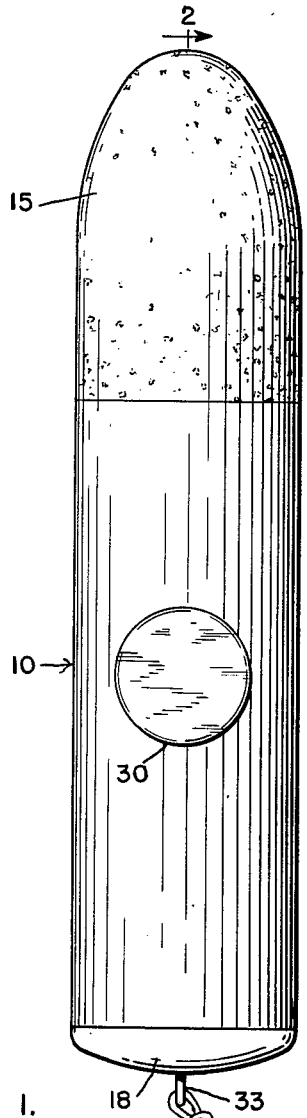
Figure 1 is a side elevational view of a signal device illustrative of the invention.
Figure 2:
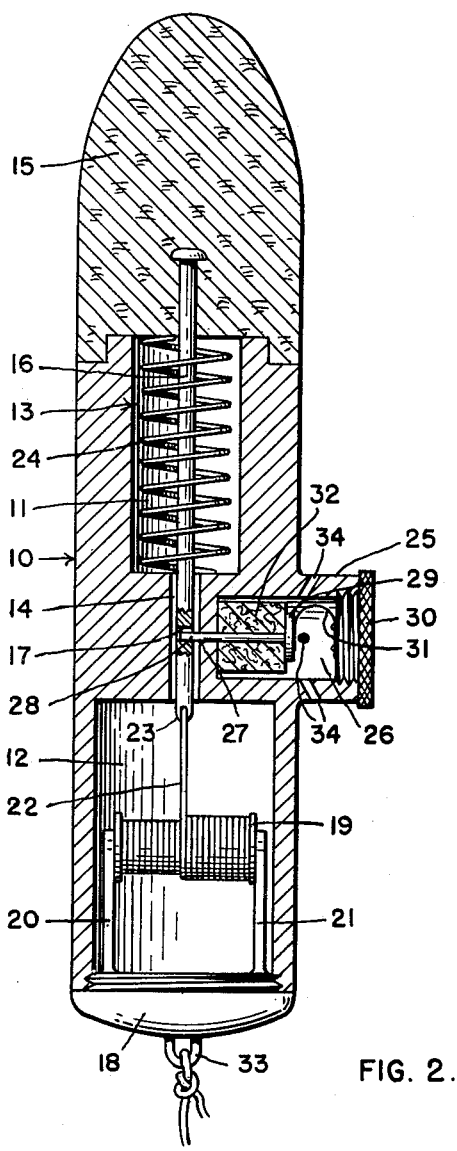
Figure 2 is a longitudinal cross sectional view on the line 2—2 of Figure 1.
Figure 3:
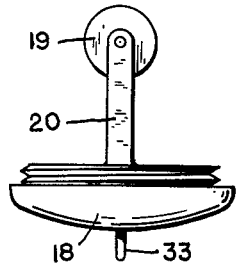
Figure 3 is a side elevational view of an end member and spool constituting an operative component of the device illustrated in Figures 1 and 2.

With continued reference to the drawing, the signal device comprises an elongated body 10 of cylindrical shape having a bore 11 extending longitudinally and coaxially therethrough. The bore 11 includes a portion 12 at one end of the body 10 having a diameter only slightly less than the external diameter of the body, a portion 13 at the other end of the body having a diameter less than the diameter of the portion 12 and a portion 14 of restricted diameter between the portions 12 and 13. A float 15 of buoyant material, such as cork, and having a bullet shape is mounted on the body 10 at the end of the body to which the portion 13 of the bore 11 opens and a stem 16 is secured at one end to the float 15 and extends through the portions 13 and 14 of the bore 11, being provided within the portion 14 of the bore with a transverse aperture or recess 17 the purpose of which will presently appear.

The end of the body 10 to which the portion 12 opens is closed by a screw cap 18 threaded into internal screw threads provided at the adjacent end of the body and a spool 19 is disposed between and journaled on a pair of legs 20 and 21 which extend from the screw cap 18 inwardly of the portion 12 of the bore in the body 10 in spaced apart and substantially parallel relationship to each other.

A flexible line 22 is wound on the spool 19 and secured at one end to the stem 16 at the end of the stem remote from the float 15, as indicated at 23.

A coiled compression spring 24 is disposed within the portion 13 of the bore 11 and surrounds the stem 16 between the inner end of the portion 13 of the bore 11 and the adjacent end surface of the float 15 to resiliently urge the float away from the body 10.

A boss 25 projects laterally from the body 10 at the inner end of the bore portion 12 and encloses a chamber 26 which extends into the adjacent portion of the body and communicates with the restricted portion 14 of the bore 11 through an aperture 27 in the body 10. A latch pin 28 extends from the chamber 26 through the aperture 27 and has one end engaged in the recess 17 in the stem 16 to hold the float 15 adjacent the corresponding end of the body 10 against the force of compression spring 24. A flat head 29 is provided on the end of the latch pin 28 remote from the stem 16 and a screw plug 30 is threaded into the outer end of the boss 25. A leaf spring 31 is disposed in the chamber 26 between the inner end of the plug 30 and the head 29 of the latch pin and resiliently urges the latch pin into engagement in the recess 17 of the stem 16.

A sleeve 32 of hygroscopic material, such as wood or paper, surrounds the latch pin 28 between the head 29 of the pin and the inner end of the chamber 26 and this sleeve, when submerged for several hours, will expand sufficiently to move the end of the latch pin remote from the head 29 out of the aperture or recess 17 in the stem 16 and free the float 15 for movement away from the body 10 by the spring 24. After the float has been moved clear of the body, it will rise to the surface of the water from a submerged position, winding enough of the line 22 off of the spool 19 to rest on the surface of the water.

A loop or staple 33 is secured to and extends outwardly from the end plug 18 for attaching the device to an object or to a person and it is to be understood that other fastening means may be provided as may be found convenient or desirable, without in any way exceeding the scope of the invention.

Apertures or ports 34 extend through the wall of the boss 25 at angularly spaced locations around the boss to admit water to the chamber 26 for expanding the hygroscopic cylinder 32 when the device is submerged in water and the float 15 is preferably brightly colored or provided with a luminous coating so that it can be easily located on the water.

With the signal device attached to an object or body, if the object or body remains submerged in water for a length of time sufficient to expand the sleeve 32 of the device, the float will be released and will rise to the surface of the water thereby indicating the location of the submerged object or body. The device may be used near or in the water for an extended period of time, however, without the float becoming released from the body as it requires an extended period of time for the hygroscopic sleeve 32 to expand sufficiently to release the latch pin 28 from the stem 16 of the device.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A signal device comprising an elongated body having a bore extending longitudinally therethrough, a float of buoyant material disposed on one end of said body, a stem secured at one end of said float and extending through the bore of said body, a spool journaled in said body, a line wound on said spool and connected at one end to said stem, a compression spring in said body bearing against said float and resiliently urging the latter away from said body, said stem having a recess therein at a location spaced from said float, a latch pin mounted in said body and engaging in the recess in said stem to hold said float adjacent the corresponding end of said body against the force of said spring, a latch spring carried by said body and engaging said latch pin urging the latter into engagement in the recess in said stem, and a sleeve of hygroscopic material surrounding said latch pin and expansible upon submersion in water to move said latch pin out of engagement with said stem and free said float for movement away from said body.

2. A signal device comprising an elongated body having a bore extending longitudinally therethrough, a float of buoyant material disposed on one end of said body, a stem secured at one end to said float and extending through the bore of said body, a spool journaled in said body, a line wound on said spool and connected at one end to said stem, a compression spring in said body bearing against said float and resiliently urging the latter away from said body, said stem having a recess therein at a location spaced from said float, a latch pin mounted in said body and engaging in the recess in said stem to hold said float adjacent the corresponding end of said body against the force of said spring, a latch spring carried by said body and engaging said latch pin urging the latter into engagement in the recess in said stem, and a sleeve of hygroscopic material surrounding said latch pin and expansible upon submersion in water to move said latch pin out of engagement with said stem and free said float for movement away from said body, the bore in said body including an intermediate portion of a diameter slightly greater than the diameter of said stem and end portions of diameters greater than the diameter of said intermediate portion one receiving said compression spring and the other receiving said spool.

3. A signal device comprising an elongated body having a bore extending longitudinally therethrough, a float of buoyant material disposed on one end of said body, a stem secured at one end to said float and extending through the bore of said body, a spool journaled in said body, a line wound on said spool and connected at one end to said stem, a spring in said body bearing against said float and resiliently urging the latter away from said body, said stem having a recess therein at a location spaced from said float and said body having means providing a chamber extending perpendicularly from said bore and communicating with the latter at the location of the recess in said stem, a latch pin disposed in said chamber and having one end engaging in the recess in said stem and a head on its other end, means closing the end of said chamber remote from said bore, a latch spring disposed between the head of said latch pin and said means closing the outer end of said chamber resiliently urging said latch pin into engagement in the recess in said stem, and a sleeve of hygroscopic material surrounding said latch pin between said head and the inner end of said chamber and expansible upon submersion in water to move said latch pin out of engagement with said pin and free said float for movement away from said body.

CLARENCE H. SAVARY.

References Cited in the file of this patent

UNITED STATES PATENTS

| Number | Name | Date |
|---|---|---|
| 1,117,639 | Cooley | Nov. 17, 1914 |
| 1,117,889 | Ostergren et al. | Apr. 4, 1916 |
| 1,549,796 | Parsons et al. | Aug. 18, 1925 |

FOREIGN PATENTS

| Number | Country | Date |
|---|---|---|
| 19,824 | Great Britain | Nov. 3, 1892 |